(12) United States Patent
Kikata et al.

(10) Patent No.: US 9,229,443 B2
(45) Date of Patent: Jan. 5, 2016

(54) NUMERICAL CONTROL MACHINE TOOL

(75) Inventors: Kazuhiro Kikata, Aichi Prefecture (JP); Morikuni Kimura, Aichi Prefecture (JP); Sachio Ikeda, Aichi Prefecture (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 884 days.

(21) Appl. No.: 13/513,988

(22) PCT Filed: Dec. 15, 2009

(86) PCT No.: PCT/JP2009/070866
§ 371 (c)(1),
(2), (4) Date: Jun. 5, 2012

(87) PCT Pub. No.: WO2011/074064
PCT Pub. Date: Jun. 23, 2011

(65) Prior Publication Data
US 2012/0239182 A1 Sep. 20, 2012

(51) Int. Cl.
*G05D 3/00* (2006.01)
*G05B 19/4061* (2006.01)

(52) U.S. Cl.
CPC .. *G05B 19/4061* (2013.01); *G05B 2219/35316* (2013.01); *G05B 2219/49147* (2013.01); *G05B 2219/49157* (2013.01)

(58) Field of Classification Search
CPC ............... G05B 19/4061; G05B 2219/49157; G05B 2219/35316; G05B 2219/49147
See application file for complete search history.

(56) References Cited

U.S. PATENT DOCUMENTS

| 4,442,493 | A | * | 4/1984 | Wakai et al. | 700/177 |
| 4,489,377 | A | * | 12/1984 | Mawyer et al. | 700/178 |
| 4,503,373 | A | * | 3/1985 | Nozawa et al. | 318/570 |
| 4,758,961 | A | * | 7/1988 | Uemura et al. | 700/160 |
| 5,255,200 | A | * | 10/1993 | Torizawa et al. | 700/180 |
| 6,754,555 | B2 | * | 6/2004 | Yamato | 700/178 |

(Continued)

FOREIGN PATENT DOCUMENTS

| DE | 102006029527 A1 | 12/2007 |
| GB | 2117929 A | 10/1983 |

(Continued)

OTHER PUBLICATIONS

Supplementary European Search Report pertaining to corresponeding European Patent Application No. 09852260.0.

(Continued)

*Primary Examiner* — Ramesh Patel
(74) *Attorney, Agent, or Firm* — Mori & Ward, LLP

(57) ABSTRACT

An NC control unit 100 includes a touch panel display device 155 through which a barrier canceling command is input and a machining control section 160 that performs an interference check for interference between a milling tool 70 and a chuck 58 and jaws 60. When the machining control section 160 determines that interference occurs and stops movement of a tool rest 54, the machining control section 160 writes the barrier canceling command that commands cancelation of the interference check for a process of a machining program where the interference has been determined based on manipulation of the display device 155. When the machining program including the barrier canceling command is carried out to machine subsequent workpieces, the machining control section 160 omits the interference check for the process corresponding to the barrier canceling command.

6 Claims, 6 Drawing Sheets

(56) References Cited

U.S. PATENT DOCUMENTS

2003/0060909 A1* 3/2003 Yamato .......................... 700/90
2008/0086221 A1* 4/2008 Ogawa ............................ 700/17

FOREIGN PATENT DOCUMENTS

| | | |
|---|---|---|
| JP | 58-094958 | 6/1983 |
| JP | 58-168105 | 10/1983 |
| JP | 59-129691 | 7/1984 |
| JP | 62-089116 | 4/1987 |
| JP | 01-321110 | 12/1989 |
| JP | 05-237743 | 9/1993 |
| JP | 10-055209 | 2/1998 |
| JP | 10-232706 | 9/1998 |
| JP | 2003-108205 | 4/2003 |
| JP | 2006-039882 | 2/2006 |

OTHER PUBLICATIONS

International Search Report for International Application No. PCT/JP2009/070866.
Written Opinion of the International Searching Authority for International Application No. PCT/JP2009/070866.
International Preliminary Report on Patentability for International Application No. PCT/JP2009/070866 (Jul. 10, 2012).

* cited by examiner

NUMERICAL CONTROL MACHINE TOOL

FIELD OF THE INVENTION

The present invention relates to a numerical control machine tool.

BACKGROUND OF THE INVENTION

Conventionally, an interference check is performed in a numerical control machine tool to prevent interference between a tool rest and a holding means for holding a workpiece. The holding means may be a jig such as chuck jaws or a vise. Typically, in an interference check for chuck jaws, a chuck barrier is defined on an X-Z plane for each chuck jaw, and it is determined whether the tool rest or the cutting edge of the cutter enters the chuck barriers, while the tool rest or a cutter of a tool is moved on the X-Z plane (see Patent Document 1). Parameters necessary for setting chuck barriers are set in advance before shipment of the numerical control machine tool. As a result, simply by setting the jaw shape, a user can perform an interference check.

In case of milling a workpiece, the cutting edge of a tool may have to enter a gap between two jaws. In this case, an interference check is canceled before executing a machining program. Specifically, the chuck barriers are canceled so as to allow the cutting edge of the tool to enter the gap between the jaws. This makes it necessary for the operator to perform a visual interference check throughout the processes of the machining program. As a result, the operator may erroneously allow an interference between the tool rest and the holding means to occur.

Patent Document 2 discloses a method for selectively activating and de-activating an interference check between a cutting tool and a non-safety zone. According to this method, it is determined whether a machining program to be carried out is a legitimate program written according to a legitimate procedure depending on whether there is specific code written in this machining program. If the machining program is a legitimate program, the movement of the cutting tool is prevented from automatically stopping even when the cutting tool enters the non-safety zone.

However, this method requires a prolonged time for editing programs in advance and checking for interference in an actual machine tool when in an initial product machining after completion of program writing.

Patent Document 3 is a publication representing the state of the art at the time of filing.

PRIOR ART REFERENCES

Patent Documents

Patent Document 1: Japanese Laid-Open Patent Publication No. 5-237743
Patent Document 2: Japanese Laid-Open Patent Publication No. 1-321110
Patent Document 3: Japanese Laid-Open Patent Publication No. 58-94958

SUMMARY OF THE INVENTION

Accordingly, it is an objective of the present invention to provide a numerical control machine tool capable of performing an interference check in an initial product machining without increasing the burden on the operator and capable of ensuring safe machining in machining second and subsequent products by reflecting the result of interference checking in the program.

To achieve the foregoing objective, in accordance with one aspect of the present invention, a numerical control machine tool is provided that includes a holding means that holds a workpiece, a barrier setting means that sets a barrier with respect to the holding means, a machining means that machines the workpiece, a movement means that moves the machining means, a control means that controls movement of the movement means in accordance with a machining program of the workpiece, and an interference checking means that stops the movement of the movement means when it is determined that the machining means enters the barrier for the holding means. The machine tool further includes a manipulation means and a writing means. Through the manipulation means, a barrier canceling command for canceling the barrier set with respect to the holding means is input. When the movement of the movement means is stopped due to determination by the interference checking means that interference occurs, based on manipulation of the manipulation means the writing means writes the barrier canceling command in the machining program where the interference checking means determines that interference occurs, thereby canceling interference check executed by the interference checking means. When the machining program in which the barrier canceling command is written is carried out, the interference checking means omits the interference check at the program portion in which the barrier canceling command has been written.

According to this configuration, when it is determined that the machining means enters the barrier, movement of the machining means is stopped immediately before or on the boundary line of the barrier. However, if the operator confirms that the machining means actually does not interfere with the holding means, the operator causes the writing means to write a barrier canceling command in the machining program through manipulation of the manipulation means. Accordingly, in the second and subsequent machining of workpieces, the interference check is canceled at a portion where safety has been assured due to no interference between the holding means and the machining means, or, in other words, at a portion where the interference checking means has determined that interference occurs but the barrier canceling command has been written in the initial product machining. As a result, since the barrier is effective in the initial product machining, the operator is allowed to operate without paying attention to the interference check. Further, when the machining is stopped by the interference check, the machining means is stopped in the vicinity of the holding means. This allows the operator to easily confirm whether interference will occur in a subsequent step of the program with reference to the positions of the machining means and the holding means relative to each other. The operator is allowed to reflect the result of judgment to the machining program easily through teaching.

In the above numerical control machine tool, the machining program may include one or more processes, and when the process comes to an end the writing means may write the barrier canceling command for the process in which it is determined that interference occurs.

According to this configuration, the barrier canceling command is written in the machining program at the end of the process.

In the above numerical control machine tool, if the process has a tool changing command, the writing means may write the barrier canceling command considering the tool changing command as an end of the process.

According to this configuration, the barrier canceling command is written when the process ends by executing the tool changing command as an end of the process.

In the above numerical control machine tool, it is preferable that the holding means be a chuck mounted on a spindle, and the barrier be a chuck barrier set with respect to the chuck.

According to this configuration, in the subsequent and following machining, the interference check on the machining means with the chuck, which is performed by the interference checking means, can be canceled in the process in which safety due to no interference between the chuck and the machining means has been assured, that is, in the process in which the barrier canceling command has been written.

In the above numerical control machine tool, the holding means may be a jig mounted on a table, and the barrier may be a jig barrier set with respect to the jig.

According to this configuration, in the subsequent and following machining, the interference check on the machining means with the jig, which is performed by the interference checking means, can be canceled for the process in which safety due to no interference between the jig and the machining means has been assured, that is, in the process in which the barrier canceling command has been written.

DETAILED DESCRIPTION OF THE PREFERRED EMBODIMENTS

Figure 1:
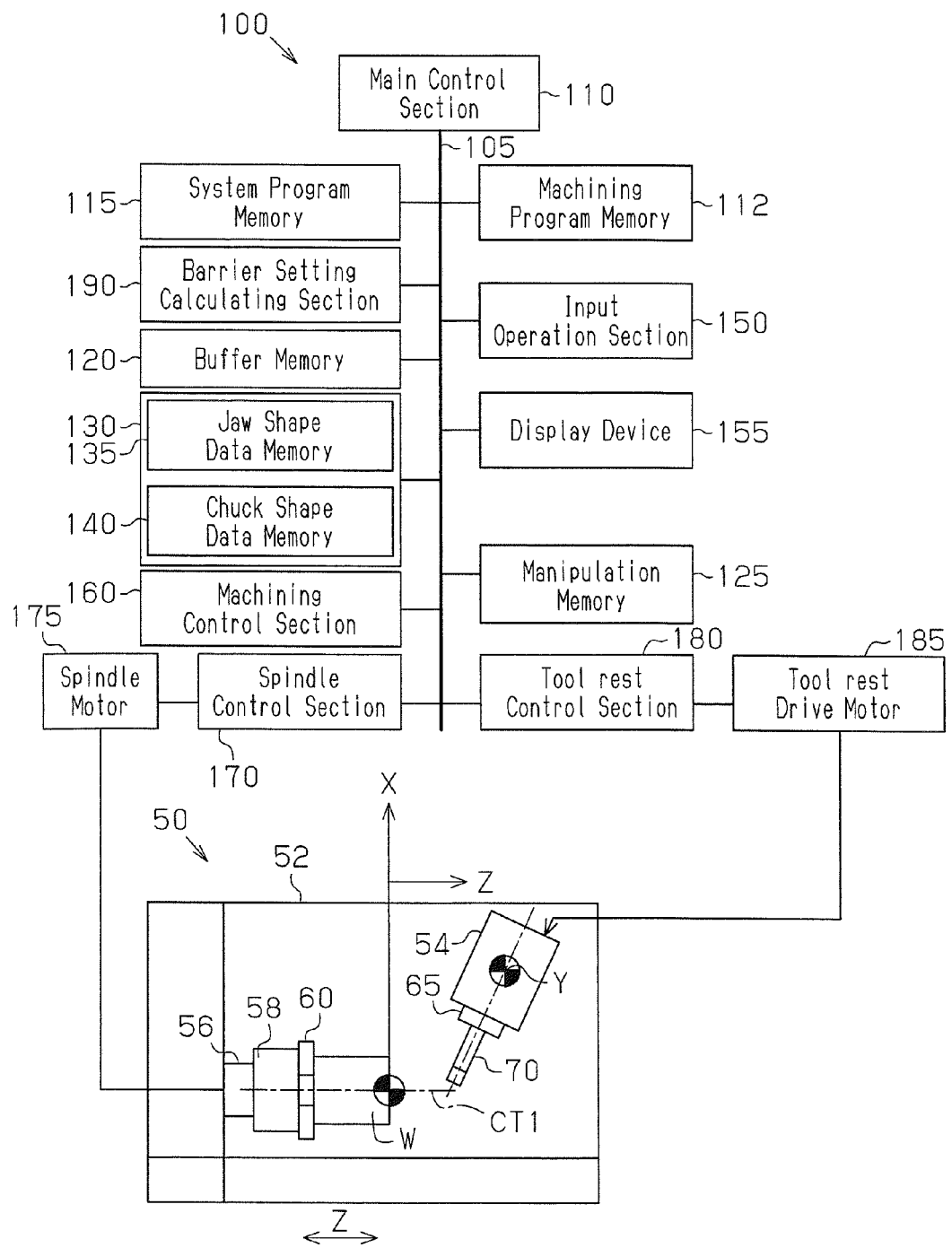
FIG. 1 is a block diagram representing the system of an NC machining apparatus according to one embodiment of a numerical control machine tool of the present invention.

A numerical control machine tool according to one embodiment of the present invention will now be described with reference to FIGS. 1 to 7. FIG. 1 is a block diagram representing the numerical control machine tool configured with an NC machining apparatus 50 and the system of an NC control unit 100.

The NC control unit 100 is configured by a computer. The NC control unit 100 has a main control section 110 configured by a CPU. A machining program memory 112, a system program memory 115, a buffer memory 120, a manipulation memory 125, a memory section 130, an input operation section 150 having a keyboard, a display device 155 configured by a liquid crystal display device or the like, various control sections 160, 170, and 180, and a barrier setting calculating section 190 are connected to the main control section 110 through a bus line 105.

The machining program memory 112, the buffer memory 120, and the manipulation memory 125 each include a random access memory (RAM), which is readable and rewritable. The system program memory 115 is configured by a read only memory (ROM), which is only readable.

The memory section 130 includes a hard disk and a memory device that is readable and rewritable. The memory section 130 has a jaw shape data memory section 135 and a chuck shape data memory section 140. The memory section 130 stores product shape data, material data, tool data, machining conditions, and machine tool data.

The product shape data is data used to define the shape of a product. The product shape data is data represented by coordinate values in a three-dimensional space. The material data is data regarding the shape and the properties of the material. The tool data is data regarding a tool held by a tool rest 54. The tool data is data regarding the types of the tool such as a tool including a turning tip, a drill, an end mill, or a face mill, the nominal dimension of the tool, and the material of the tool. The tool held by the tool rest 54 is a machining means. The machining conditions represent data regarding the feed amount and the cutting speed of the tool. For example, in the case of the turning tip, the tool feed amount is a feed amount per rotation. The machining conditions are set for each of the tools in correspondence with a machining process such as rough machining or finish machining, the material properties, and the material of the tool. The machine tool data is, for example, data regarding the type of the machine tool such as a machining center or a lathe and the configuration of the machine tool.

The jaw shape data memory section 135 stores various types of jaw shape data. With reference to FIG. 2, the jaw shape data is data representing dimensions of components forming a jaw 60.

Figure 2A:
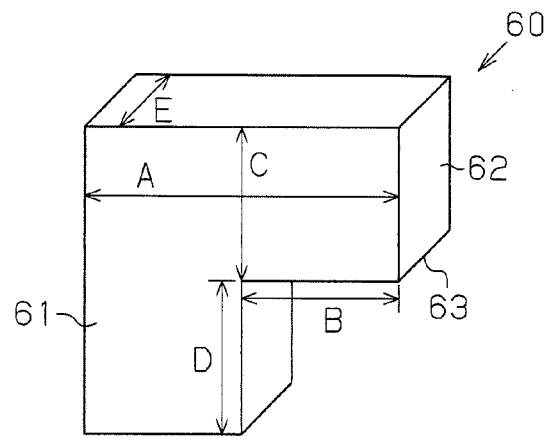
FIGS. 2(a), 2(b), and 2(c) are diagrams representing jaw shape data.
Figure 2B:
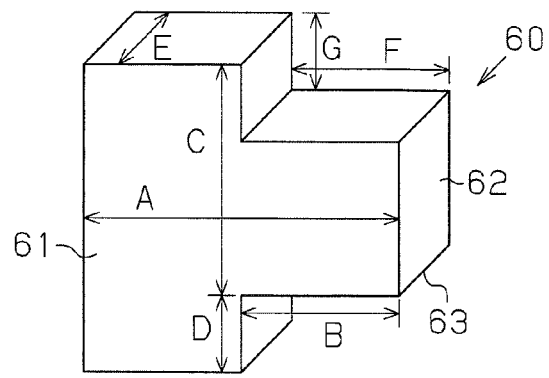
Figure 2C:
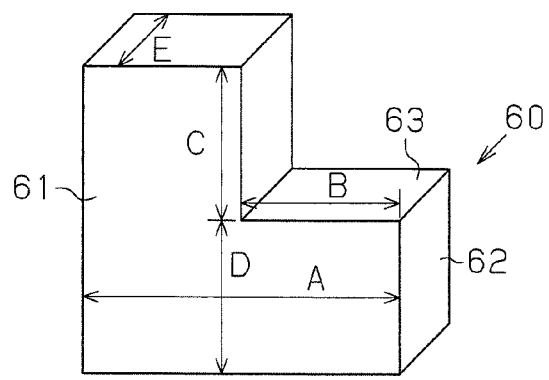

The jaw shape data regarding an outer jaw and an inner jaw will hereafter be described with reference to FIGS. 2(a) and 2(b). FIGS. 2(a) and 2(b) illustrate the outer jaw and FIG. 2(c) illustrates the inner jaw.

As illustrated in FIGS. 2(a) and 2(b), the jaw shape data of the outer jaw includes dimensions A to E and dimensions A to G, respectively. With reference to FIG. 2(c), the jaw shape data of the inner jaw includes dimensions A to E. Dimension A is the jaw height that is determined by adding the height of a basal portion 61 of the jaw and the height of a workpiece holding portion 62, which projects from the basal portion 61. Dimension B is the jaw height corresponding to a workpiece holding surface 63 of the workpiece holding portion 62. Dimension C is the length corresponding to the distance between the workpiece holding surface 63 of the workpiece holding portion 62 and an outer surface of the basal portion 61, as measured along a radial direction of a workpiece spindle. Dimension D is the length corresponding to the distance between an inner surface of the basal portion 61 and the workpiece holding surface 63 of the workpiece holding portion 62, as measured in the radial direction of the workpiece spindle. Dimension E is the thickness of the jaw 60. Dimension F is the length along the outer surface of the workpiece holding portion 62 opposite to the workpiece holding surface 63, which is the height of the workpiece holding portion 62 projecting from the basal portion 61. Dimension G is the length corresponding to the distance between the outer surface of the workpiece holding portion 62 opposite to the workpiece holding surface 63 and an outer surface of the basal portion 61. The jaw shape data is associated with the type of the jaw and stored in the jaw shape data memory section 135 through manipulation of the input operation section 150 by the operator.

Figure 5:
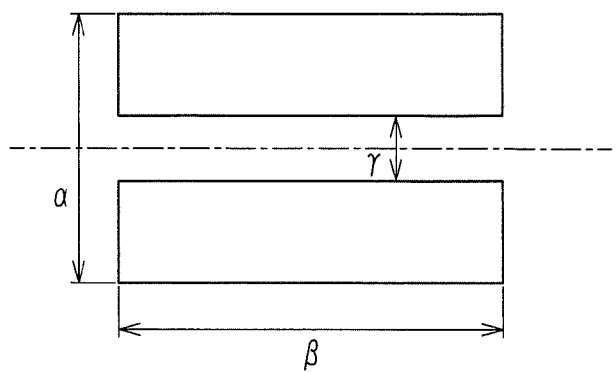
FIG. 5 is a diagram representing shape data of a workpiece spindle.

Chuck shape data is registered in advance in the chuck shape data memory section 140. The chuck shape data is data representing the shape of a chuck 58 of a workpiece spindle 56, which is illustrated in FIG. 1. As illustrated in FIG. 5, the shape data of the chuck 58 includes the outer diameter α of the chuck 58, the inner diameter γ of the chuck, and the width β of the chuck. Only one workpiece spindle 56 is shown in FIG. 1 for the illustrative purposes. However, in the case of a numerical control machine tool having a pair of opposing workpiece spindles, chuck shape data corresponding to the workpiece spindles is registered in the chuck shape data memory section 140.

The barrier setting calculating section 190 corresponds to a barrier setting means that sets and calculates a chuck barrier CB. The chuck barrier is automatically set around the chuck 58 and the jaws 60 in order to prevent interference by a tool when a workpiece W is held by the jaws 60 and machined. The chuck 58 and the jaws 60 correspond to a holding means that holds the workpiece W.

Once the operator selects jaws for workpiece machining, the chuck shape data and the jaw shape data each associated with the selected jaws are read out from the chuck shape data memory section 140 and the jaw shape data memory section 135, respectively, and used to set the chuck barrier. As an input means manipulated to select the jaw shape, a touch panel select button, which is displayed on a screen of the display device 155, may be employed instead of the input operation section 150 having the keyboard.

After the operator selects jaws, the workpiece inner diameter/outer diameter of the workpiece W to be held by the jaws is input by the operator or automatically read out from a machining program and used to set the chuck barrier.

Figure 3:
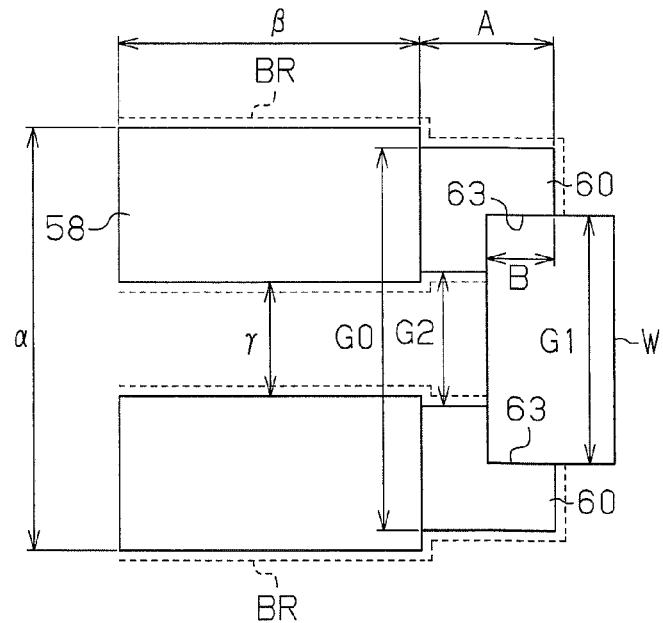
FIG. 3 is a diagram illustrating a chuck barrier for an outer jaw.
Figure 4:
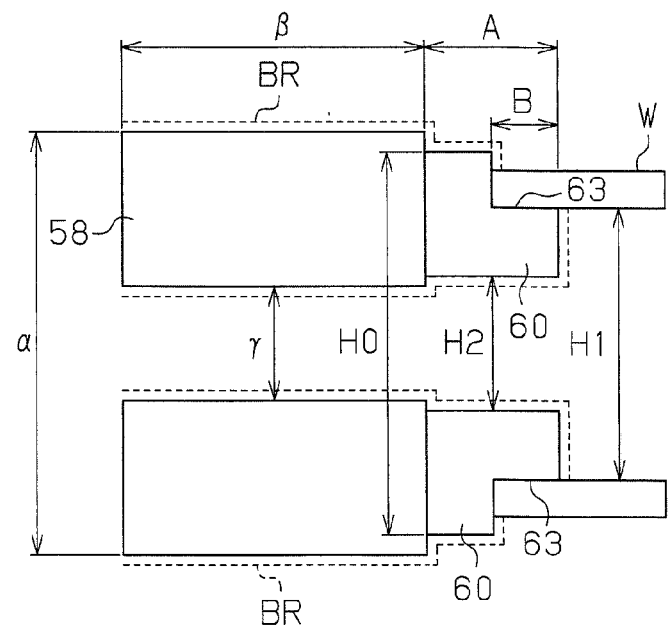
FIG. 4 is a diagram illustrating a chuck barrier for an inner jaw.

As illustrated in FIGS. 3 and 4, when the machining program is executed, the chuck barrier is automatically set by the NC control unit 100 based on data regarding the chuck barrier. FIG. 3 illustrates the chuck barrier BR corresponding to the outer jaws. FIG. 4 is the chuck barrier BR corresponding to the inner jaws.

The maximum outer diameter G0 and the inner diameters G1, G2 of the jaws 60 (the outer jaws) illustrated in FIG. 3 are calculated using the data registered in advance in the jaw shape data memory section 135 as the jaw shape data and the workpiece outer diameter. The maximum outer diameter H0 and the inner diameters H1, H2 of the jaws 60 (the inner jaws) illustrated in FIG. 4 are calculated using the data registered in advance in the jaw shape data memory section 135 as the jaw shape data and the workpiece inner diameter.

The chuck barrier BR is a spatial zone that tools are prohibited from entering, and is set in such a manner as to cover the jaws 60 and the chuck 58 as a whole. By setting the chuck barrier BR, the tool is prevented from interfering with the chuck or the jaws.

The display device 155 is formed by a touch panel screen. When the machining program is being executed, the screen displays a cycle starting touch area through which cycle starting is commanded and a barrier canceling touch area through which the barrier is canceled. The display device 155 corresponds to a manipulation means.

The machining control section 160 outputs control commands to the spindle control section 170, which drives the workpiece spindle 56 to rotate, and the tool rest control section 180, which controls the tool rest 54, in accordance with a machining program stored in the machining program memory 112. The machining program memory 112 corresponds to a machining program memory means. The machining control section 160 corresponds to a control means, a writing means, and an interference checking means.

The spindle control section 170 controls rotation of a spindle motor 175 based on a command signal. The tool rest control section 180 controls a plurality of tool rest drive motors 185. FIG. 1 shows only one of the tool rest drive motors 185 for the illustrative purposes. The tool rest drive motors 185 allow the tool rest 54 to move along the Z axis and the X axis perpendicular to the Z axis. The tool rest 54 is movable also along the Y axis perpendicular to the X axis and the Z axis and around the B axis about the Y axis by means of the tool rest drive motors 185. Hereinafter, movement of the tool rest 54 along each one of the aforementioned axes will be referred to as axial movement. The axial movement includes movement along the X, Y, and Z axes and revolution about the B axis. The tool rest drive motors 185 correspond to a movement means.

As illustrated in FIG. 1, the NC machining apparatus 50 has the tool rest 54 and the workpiece spindle 56 mounted in a frame 52. The chuck 58 is mounted on the workpiece spindle 56. The chuck 58 has a plurality of jaws 60, which are capable of holding the workpiece W. The spindle motor 175 allows the workpiece spindle 56 to rotate about the spindle center line CT1 parallel to the Z axis. A tool holding portion 65 which holds a milling tool 70 in exchangeable manner is formed in the tool rest 54.

Figure 6:
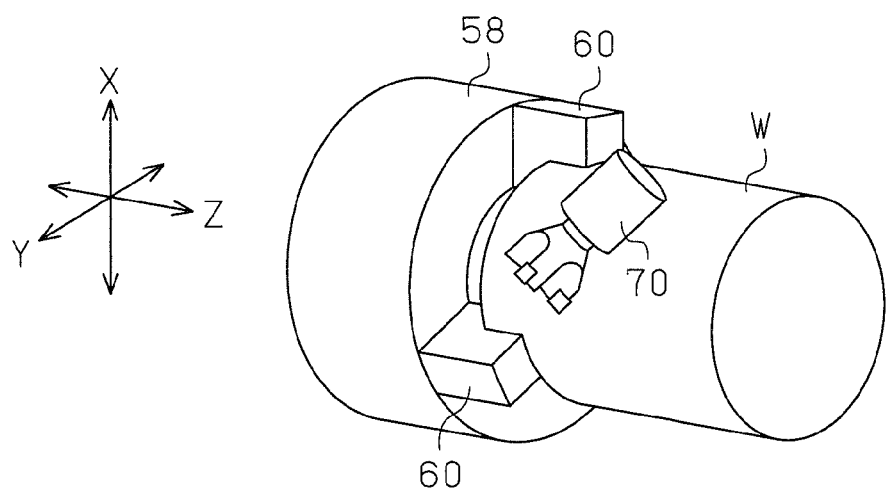
FIG. 6 is a diagram illustrating a tool entering a gap between jaws.

Operation of the NC machining apparatus 50 and the NC control unit 100 will now be described with reference to FIGS. 6 and 7. The machining program memory 112 stores a machining program for machining the workpiece W held by the jaws 60 (the outer jaws), as illustrated in FIG. 6, using the milling tool 70 moved between the jaws.

Figure 7:
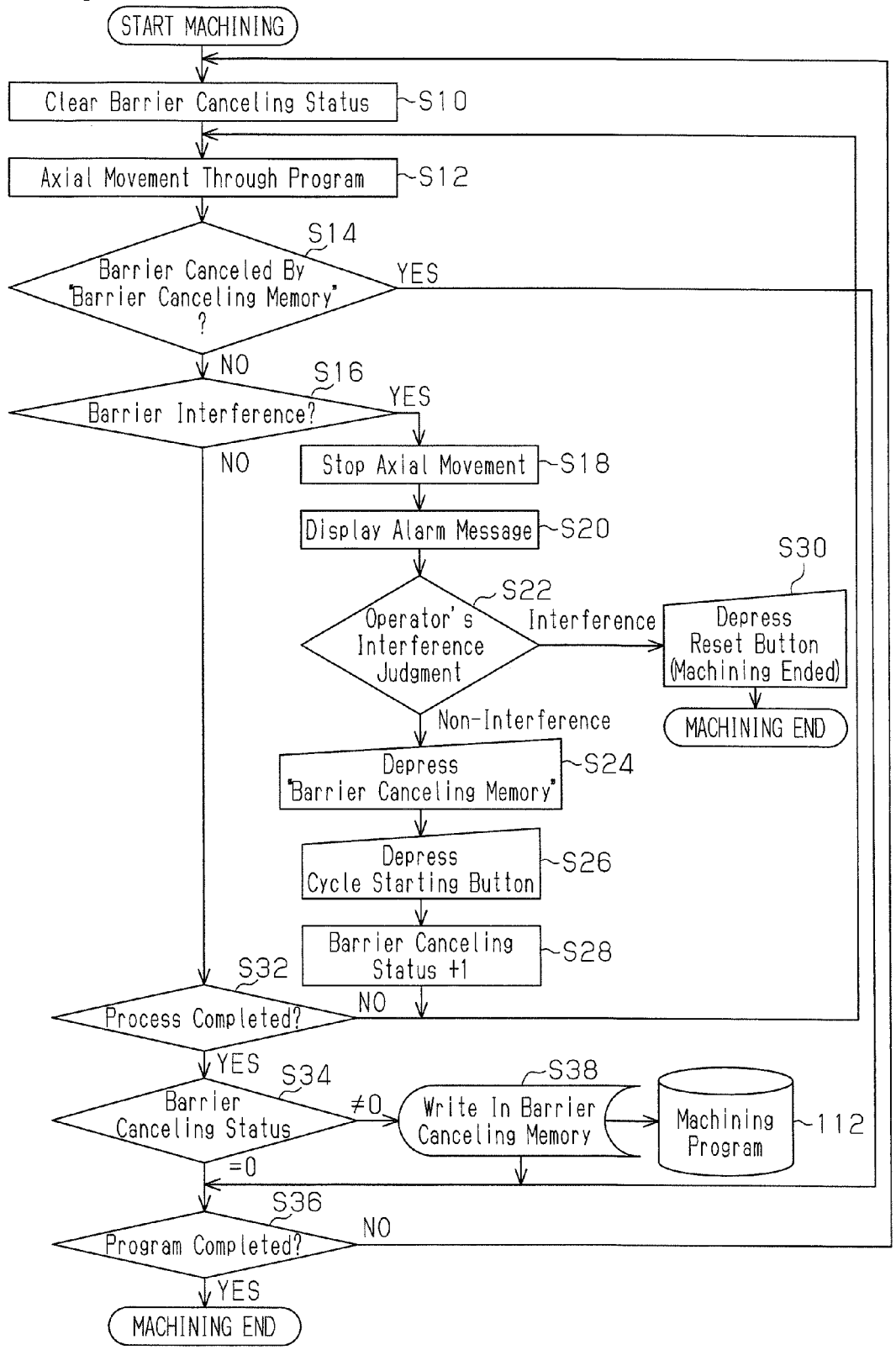
FIG. 7 is a flowchart representing a machining program.

FIG. 7 is a flowchart representing a machining program executed by the machining control section 160. When the machining program is carried out, the barrier setting calculating section 190 sets and calculates the chuck barrier BR.

Once execution of the machining program is started, the machining control section 160 first clears a barrier canceling status in the manipulation memory 125 in S10. In S12, the machining control section 160 performs the axial movement of the tool rest 54 for each block of the machining program.

In S14, the machining control section 160 determines whether the current state is a barrier canceled state due to a barrier canceling command. Specifically, the machining control section 160 determines whether the current state is the barrier canceled state depending on whether the barrier canceling command has been written in the currently performed block. If the current state is the barrier canceled state, S36 is carried out. Otherwise, S16 is performed. Specifically, for an initial machining of a workpiece, the barrier canceling command has not yet been written in the currently performed block and thus the current state is not the barrier canceled state. As a result, the machining control section 160 performs S16 after S14.

When S16 is carried out, the current state is not the barrier canceled state. Accordingly, the machining control section 160 determines whether the axial movement of the tool rest 54 causes the tool rest or the tool to enter the chuck barrier BR, which has been set and calculated by the barrier setting calculating section 190.

Specifically, the chuck barrier BR of the chuck jaws is set on the X-Z plane. Accordingly, if the tool rest or the tool moves on the X-Z plane, the machining control section 160 determines whether the tool rest or the cutting edge of the tool proceeds into, or, in other words, enters the chuck barrier BR. To facilitate understanding, the description below will mention only to the cutting edge of the tool entering the chuck barrier BR. However, actual determination is carried out whether the tool rest 54, in addition to the cutting edge of the tool, also enters the chuck barrier BR.

When it is determined that the milling tool 70 has not entered the chuck barrier BR in S16, the machining control section 160 carries out S32. If it is determined that the milling tool 70 has entered the chuck barrier in S16, the machining control section 160 stops the axial movement of the tool rest 54 in S18 in such a manner that the milling tool 70 stops immediately before or on the boundary line of the chuck barrier BR. Then, in S20, the machining control section 160 displays an alarm message on the display device 155 and activates an alarm device. Through such alarm display on the display device 155 and the alarm device activation, visual interference check is suggested to the operator. If, in S22, the operator judges that the milling tool 70, which has been stopped immediately before the chuck barrier BR, interferes with the chuck if the milling tool 70 continues its axial movement, the operator depresses a reset button formed on the input operation section 150 in S30. The machining control section 160 then ends the machining program as a reset signal is input. Alternatively, the reset button may be formed on the touch panel screen arranged in the display device 155.

If the operator determines that the milling tool 70, which has been stopped immediately before or on the boundary line of the chuck barrier BR, will not interfere with the chuck even if the milling tool 70 continues its axial movement, the operator performs a barrier canceling memory operation in S24. Specifically, the operator touches a barrier canceling memory touch area displayed on the screen of the display device 155. Then, in S26, the operator touches the cycle starting touch area displayed on the screen of the display device 155. After the barrier canceling memory touch area and the cycle starting touch area are touched, the machining control section 160 increments the count of the barrier canceling status of the manipulation memory 125 by +1 and then re-performs S12.

The machining control section 160 determines whether the process has been completed in S32. The machining program includes one or more processes. Each process includes a sequence configured by one or more blocks. Each sequence has a sequence number. If the currently executed block is a code indicating that the block is the final block of the sequence or a tool replacement commanding code, the machining control section 160 determines that one process has been completed through the current axial movement of the tool rest 54. If the machining control section 160 determines that the process is incomplete in S32, the machining control section 160 re-performs S12. If the machining control section 160 determines that the process is complete, the machining control section 160 performs S34 and determines whether the count value of the barrier canceling status of the manipulation memory 125 is 0.

If the count value of the barrier canceling status is not 0 but greater than or equal to +1, the machining control section 160 performs S38. In S38, the machining control section 160 writes the barrier canceling command in the block corresponding to the process for which the count value of the barrier canceling status of the manipulation memory 125 is not 0. After the barrier canceling command is written in the machining program and thus the machining program is corrected, the machining program is registered in the machining program memory 112. Afterwards, the machining control section 160 carries out S36.

If the count value of the barrier canceling status is 0 in S34, the machining control section 160 carries out S36. In S36, the machining control section 160 determines whether there is any subsequent sequence that must be performed while the machining program is being carried out. Specifically, the machining control section 160 determines whether the machining program has been completed. If the machining program is incomplete, the machining control section 160 carries out S10. If the machining program is complete, the machining control section 160 ends the machining program.

If the next workpiece to be machined is the same as the initially machined workpiece, the machining control section 160 executes S10, S12, and S14. Then, in S14, since the barrier canceling command is set in the block of the machining program, the machining control section 160 carries out S36.

Accordingly, in the second and the later machining of workpieces W, the machining control section 160 cancels the interference check if, although it has been determined through the program in the initial product machining that the milling tool would enter the chuck barrier of the chuck 58 and the jaw 60, the operator has determined that such interference will not occur.

This makes it unnecessary to edit the machining program in advance. Specifically, in the initial product machining, the operator is allowed to write the barrier canceling command in the machining program through teaching when the chuck 58 and the jaws 60 that hold the workpiece and the milling tool do actually not interfere with each other. The operator is able to easily make a program for the second and the later machining for canceling the function of preventing interference between the chuck 58 and the jaw 60 and the milling tool.

The illustrated embodiment has the advantages described below.

At the end of the process for which the machining control section 160 has determined that interference occurs, the machining control section 160 writes the barrier canceling command in the block of the machining program corresponding to the process. Accordingly, the above described advantages are achieved.

If, for example, the machining program is written in an interactive language, the program does not include clear end indicators of the processes from one another. One such program is publicly known through, for example, Patent Document 3. This type of machining program includes a tool changing command for a tool to be used in the subsequent machining mode for the time when the current mode is switched to a different machining mode. In this case, the tool changing command may be treated as an end indicator of the processes and then a barrier canceling command may be written.

The chuck 58 of the workpiece spindle 56 and the jaws 60 of the chuck 58 are the holding means. The chuck 58 and the jaws 60 have the respective barriers. In this case, for the workpieces W to be machined in the subsequent and later machining which has the same shape as the initially machined workpiece W, the machining control section 160 cancels the interference check on the milling tool 70 with the chuck 58 and the jaws 60 for the process for which the operator has determined that interference will not occur between the chuck 58 and the jaw 60 and the milling tool 70 and has written a barrier canceling command in the corresponding block.

The illustrated embodiment may be modified to the forms described below.

Although the display device 155 having the touch panel screen is the manipulation means for inputting the barrier canceling command in the illustrated embodiment, a barrier canceling button may be provided in the input operation section 150. Alternatively, the display device 155 may be configured in such a manner as to display a barrier canceling button and allow barrier canceling through key manipulation or by means of a pointing device.

Figure 8:
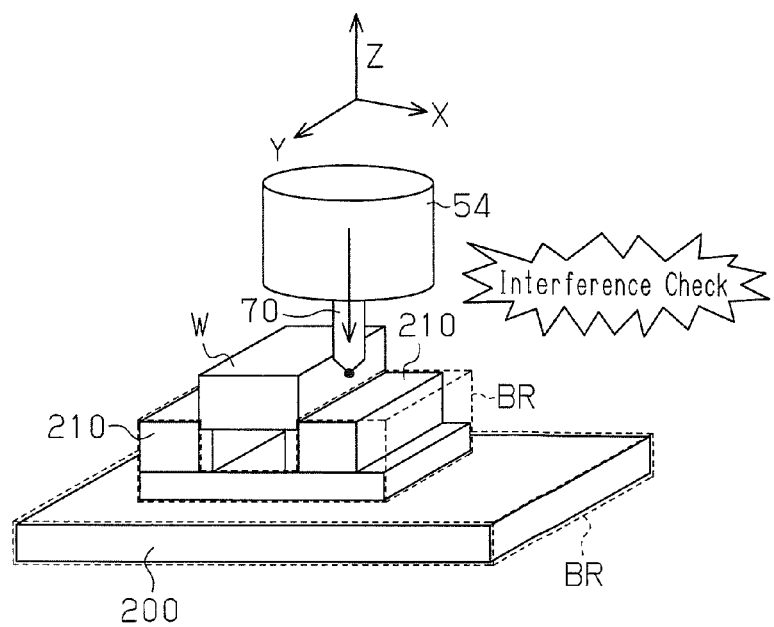
FIG. 8 is a diagram illustrating a jig barrier.
Figure 9:
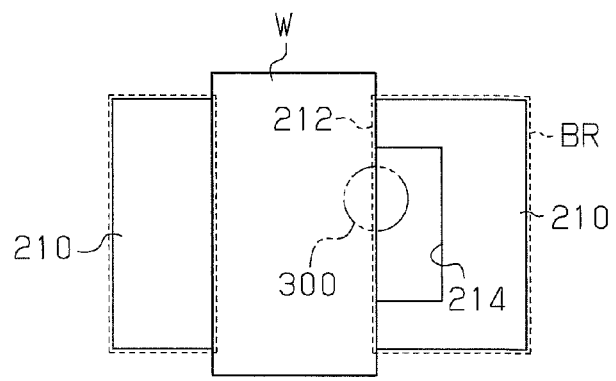
FIG. 9 is another diagram illustrating the jig barrier.

Although the holding means of the illustrated embodiment are a chuck and jaws, the holding means are not restricted to these components. For example, as illustrated in FIGS. 8 and 9, the holding means may be a pair of vise members 210 serving as a jig, which are mounted on a table 200. In this case, a workpiece W is clamped between the two vise members 210. Chuck barriers BR for the table 200 and the vise members 210 are set in zones in which interference of the table 200 and the vise members 210 with the milling tool 70 and the tool rest 54 is likely to happen. For the case in which the workpiece W is held on the table 200 through the vise members 210, a recess 214 may be formed in advance as illustrated in FIG. 9, in order to avoid interference with the vise members 210 when in machining. When the milling tool 70 machines the side surface of the workpiece W facing the recess 214 as indicated by the circle 300 and interference check is carried out, the milling tool 70 may have to be stopped due to the interference check despite the fact that the interference does actually not occur. Specifically, the interference check is performed with respect to jig barriers set for the vise members 210 using X-Y-Z planes as illustrated in FIG. 8. In this case, in the step in which the interference check similar to the checking of the illustrated embodiment is performed, the NC control unit stops axial movement of the tool rest 54 if it is determined that an interference occurs. If it is determined that the interference does not happen, the operator depresses the barrier canceling memory button and the cycle start displayed on the touch panel display device 155 to set the barrier canceling status +1. If the canceling status is set in this state, the barrier canceling command is written for the sequence of the corresponding process of the machining program at the end of the process. Also in this case, the same advantages as those of the illustrated embodiment are ensured.

DESCRIPTION OF THE REFERENCE NUMERALS

50 . . . NC machining apparatus, 54 . . . Tool rest, 58 . . . Chuck, 60 . . . Jaw, 70 . . . Milling tool, 100 . . . NC control unit, 112 . . . Machining program memory, 125 . . . Manipulation memory, 155 . . . Display device, 160 . . . Machining control section, 190 . . . Barrier setting calculating section

The invention claimed is:

1. A numerical control machine tool including a holding means for holding a workpiece, a barrier setting means for setting a barrier with respect to the holding means, a machining means for machining the workpiece, a movement means for moving the machining means, a control means for controlling movement of the movement means in accordance with a machining program through which the workpiece is machined, and an interference checking means for checking interference, the interference checking means stops the movement of the movement means when it is determined that the machining means enters the barrier for the holding means, the machine tool comprising:
 a manipulation means for inputting a barrier canceling command for canceling the barrier set with respect to the holding means; and
 a writing means for writing the barrier canceling command, wherein, when the movement of the movement means is stopped due to determination by the interference checking means that interference occurs during an initial machining of the workpiece by executing the machining program, the writing means writes the barrier canceling command based on manipulation of the manipulation means in the machining program where the interference checking means determines that interference occurs in order to correct the machining program by cancelling the interference check executed by the interference checking means by writing the barrier cancelling command, wherein the writing means registers the corrected machining program in memory,
 wherein the control means controls the movement of the movement means for a next workpiece being the same as the workpiece in the initial machining in accordance with the corrected machining program, in which the interference checking means omits the interference check for the portion in which the barrier canceling command has been written.

2. The numerical control machine tool according to claim 1,
 wherein the machining program includes one or more processes, and when the process comes to an end the writing means writes the barrier canceling command for the process in which it is determined that interference occurs.

3. The numerical control machine tool according to claim 2,
 wherein if the process has a tool changing command, the writing means writes the barrier canceling command considering the tool changing command as an end of the process.

4. The numerical control machine tool according to claim 1,
 wherein the holding means is a chuck mounted on a spindle, and the barrier is a chuck barrier set with respect to the chuck.

5. The numerical control machine tool according to claim 1,
 wherein the holding means is a jig mounted on a table, and the barrier is a jig barrier set with respect to the jig.

6. A method of machining a workpiece by a numerical control machine tool including a holder configured to hold a workpiece, a barrier setting device configured to set a barrier with respect to the holder, a machining device configured to machine the workpiece, and a movement device configured to move the machining device, the method comprising:
 controlling movement of the movement device in accordance with a machining program through which the workpiece is machined;
 checking whether the machining device enters the barrier for the holder during an initial machining of the workpiece by executing the machining program;
 stopping the movement of the movement device when it is determined that the machining device enters the barrier for the holder;
 inputting a barrier canceling command for canceling the barrier set with respect to the holder;
 writing, when the movement of the movement device is stopped due to that interference occurs, the barrier canceling command in the machining program where the interference occurs in order to correct the machining program by cancelling execution of the interference check by writing the barrier cancelling command;
 registering the corrected machining program in a memory; and
 controlling movement of the movement device for a next workpiece being the same as the workpiece in the initial machining in accordance with the corrected machining program, in which the interference check for the portion in which the barrier canceling command has been written is omitted.

* * * * *